UNITED STATES PATENT OFFICE.

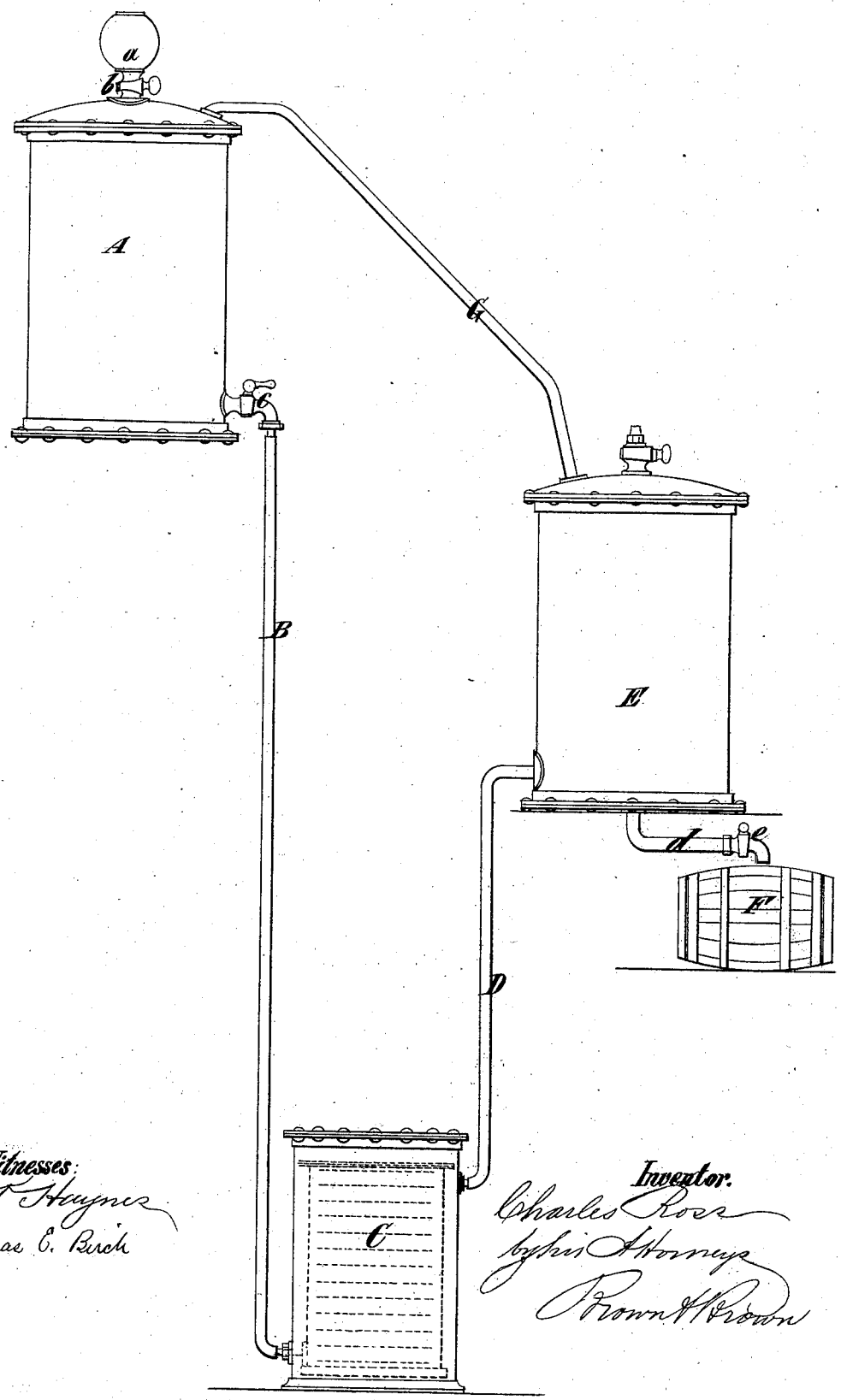

CHARLES ROSS, OF HAMBURG, GERMANY.

APPARATUS FOR FILTERING LIQUIDS.

SPECIFICATION forming part of Letters Patent No. 227,840, dated May 18, 1880.

Application filed January 16, 1880.

*To all whom it may concern:*

Be it known that I, CHARLES ROSS, a subject of the crown of Great Britain, at present residing in the city of Hamburg, in the Empire of Germany, have invented a new and Improved Apparatus for Filtering Liquors, of which the following is a specification.

My invention is particularly adapted for the filtration of any liquors containing carbonic-acid gas or other gas or gases—such, for instance, as beer; and its object is to provide for the filtering of such liquors without separating the gas or parts thereof from the liquor while passing through the filter.

To this end my invention consists in a novel arrangement of vessels for the filtered and unfiltered liquor, with a filter and pipes or conduits connecting the two vessels with the filter and with each other.

The accompanying drawing represents an elevation of an apparatus for filtering liquors embodying my invention.

While this apparatus is applicable for filtering liquors of various kinds containing carbonic-acid or other gas or gases, it is especially intended for filtering beer.

The unfiltered beer or other liquor is placed in a closed delivery-vessel, A, which is provided with a filling-opening, $a$, closed by a suitable valve or cock, $b$. From this vessel the liquor passes downward through a pipe or conduit, B, under control of a valve or cock, $c$, to a filter, C, placed at some distance below the vessel A, which constitutes the source of supply. The internal construction of the filter C is not here illustrated, as any of the filters commonly employed may be used without change. After passing through the filter the filtered liquor passes upward through a pipe or conduit, D, to a closed receiving-vessel, E, which is provided with an outlet-pipe, $d$, controlled by a valve or cock, $e$, through which the beer or other liquor may be drawn off into barrels or kegs F. The vessel A, containing the unfiltered liquor, and the receiving-vessel E, containing the filtered liquor, are connected by a pipe, G, which enables the gas to pass from the latter vessel to the former as the beer or other liquor flows from the former to the latter.

The vessel A should be placed sufficiently high above the filter to enable the weight of the column of liquor to overcome the pressure of the gas. For instance, in filtering beer the vessel A should be, say, from twelve (12) to twenty (20) feet above the filter, and the receiving-vessel E, say, from ten (10) to sixteen (16) feet above the filter.

What I claim as my invention, and desire to secure by Letters Patent, is—

The combination of the delivery-vessel A, the filter C, arranged below the same, the receiving-vessel E, arranged above the filter but below the delivery-vessel, and the pipes B, D, and G, connecting said vessel and filter, all arranged and operating substantially as and for the purpose specified.

CHARLES ROSS.

Witnesses:
J. ENGEL,
F. CLAIRMONT.